March 30, 1926.
E. L. NELSON
1,578,845
MODULATION INDICATING SYSTEM
Filed Jan. 16, 1924
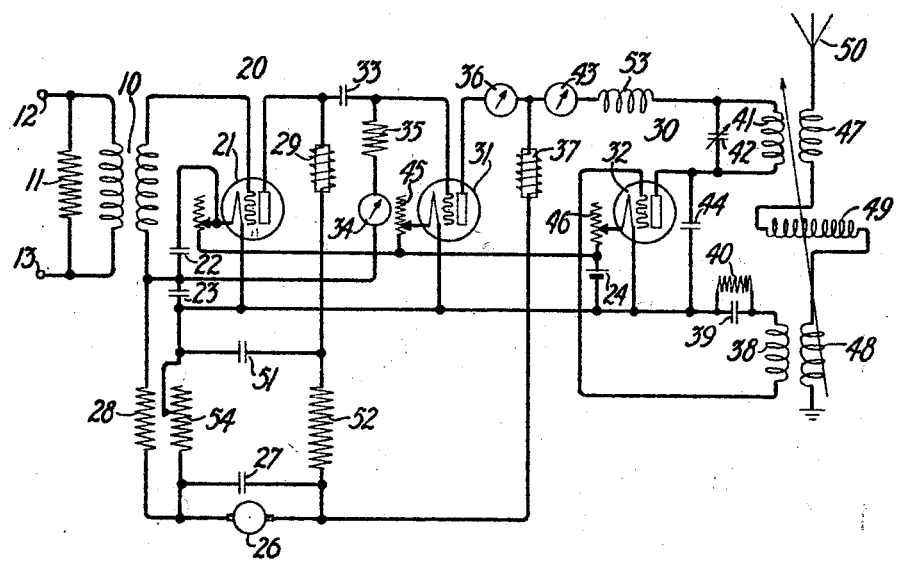
Inventor:
Edward L. Nelson
by E. W. Adams Atty.

Patented Mar. 30, 1926.

1,578,845

UNITED STATES PATENT OFFICE.

EDWARD L. NELSON, OF EAST ORANGE, NEW JERSEY, ASSIGNOR TO WESTERN ELECTRIC COMPANY, INCORPORATED, OF NEW YORK, N. Y., A CORPORATION OF NEW YORK.

MODULATION-INDICATING SYSTEM.

Application filed January 16, 1924. Serial No. 686,473.

*To all whom it may concern:*

Be it known that I, EDWARD L. NELSON, a citizen of the United States of America, residing at East Orange, in the county of Essex and State of New Jersey, have invented certain new and useful Improvements in Modulation-Indicating Systems, of which the following is a full, clear, concise, and exact description.

This invention relates to amplifying and modulating systems and more particularly to improved indicating organizations.

An object of this invention is to indicate abnormal or undesirable conditions in amplifying and modulating systems. Another object of the invention is to give an indication of the improper functioning of a radiant energy signaling system.

A further object of the invention is to indicate when space discharge tubes forming a part of amplifying or modulating systems are overloaded.

A further object of the invention is to provide an indication of the proper operative condition in a radiant energy signaling system.

A feature of the invention relates to means for indicating when modulation is taking place in a space discharge modulator.

Another feature relates to means for indicating an overload condition in a space discharge amplifier.

A further feature concerns the means provided to indicate when a signaling system comprising a space discharge modulator and a space discharge amplifier is in proper operating condition.

This invention may be embodied in a radio transmitting system comprising means for impressing signal variations upon a space discharge amplifier connected in tandem to a modulator, which comprises a second space discharge amplifier and a space discharge oscillator, arranged to produce signal modulated current in an antenna. The invention may comprise means such, for example, as a direct current milliammeter connected in the input circuit of the space discharge modulator in such manner as to indicate when a flow of current takes place therein. The invention may also comprise similar indicating devices connected in the anode circuits of space discharge tubes of the modulating and oscillating system as means for indicating when modulation is taking place. The input circuit of the space discharge modulator which is connected between a control electrode and a heated cathode of the amplifier tube above referred to is connected to a source of electrical potential whereby the control electrode is normally negatively polarized. The system is so designed that as the load on the modulator is increased the part of the system to first be overloaded is the amplifier tube in the modulator. That is, the control electrode of this tube will become positive before that of any other tube of the system. When overload takes place the potential of the control electrode becoming positive causes a flow of current in the input circuit through the indicating device or milliammeter, whereby a deflection of its indicating needle is produced as an indication to an operator of the condition of the circuit.

The indicating devices connected in the anode circuits of the space discharge modulator tubes are operated by current flowing therein when the modulator is functioning and so give a visible indication of this fact, thus an operator is able to determine when and to what extent modulation is taking place.

In the figure of the drawing a radiant energy transmission system is shown, which embodies the indicating means of this invention.

Referring to the drawing the radiant energy transmission system illustrated comprises a transformer 10 for impressing signal variations of potential upon a space discharge amplifier 20 supplying energy to a space discharge modulating system 30. The modulating system 30 is coupled in energy transfer relation to an antenna 50 from which signal modulated energy may be radiated.

The primary winding of transformer 10 is shunted by a resistance 11 and is provided with terminals 12 and 13 which may be connnected to any desired source of signal current. The secondary winding of transformer 10 is included in the input circuit of amplifier 20 which input circuit is connected to the control electrode and cathode of tube 21. The input circuit may be traced as follows: control electrode of tube 21, winding of transformer 10, grid condensers 22 and 23, to the cathode of tube 21.

A direct current generator 26 arranged to supply space current to tube 21 is connected to its anode and cathode in a series circuit comprising choke coil 29, resistance 52, and adjustable resistance 54. A condenser 27 is shunted across the generator to smooth out current variations produced by commutation. A resistance 28 is connected from the negative terminal of generator 26 to the midpoint of condensers 22 and 23. The function of this resistance will be explained later. The condenser 51 is connected in shunt to resistances 54 and 52 and generator 26 to supply a low impedance path for signal frequency currents in the output circuit of the amplifier.

The alternating current output load circuit of amplifier 20, is connected to the input circuit of a modulator 30 through a condenser 33. This condenser serves as a coupling means, and as a blocking condenser to prevent the supply of current from generator 26 to the modulator input circuit.

Modulator 30 which is arranged to operate in accordance with the method disclosed by R. A. Heising in Patent 1,442,147, issued January 16, 1923, comprises three-electrode space discharge tubes 31 and 32. Tube 31 will for convenience be referred to as the amplifier tube and tube 32 as the oscillating tube.

An indicating device 34, which may be a milliammeter, is connected in series with a resistance 35 between the grid and filament of tube 31. In the anode circuit of tube 31, which is connected between its anode and cathode, is a second indicating device 36.

The oscillating tube 32 which is of the three-electrode space discharge type comprises an input circuit connected between its control electrode and filament, which comprises the coil 38 in series with condenser 39 and shunt resistance 40. The output circuit of tube 32 is connected between its plate and filament, and comprises the condenser 42 in parallel with coil 41. A third indicating device 43 is connected in the anode circuit of tube 32 the purpose of which will be explained later. A high frequency choke coil 53 is connected in series with device 43 to prevent oscillatory currents from flowing therethrough and in the space path of tube 31. Space current is supplied to the tubes 31 and 32 by direct current generator 26 in series with choke coil 37.

The filaments of tubes 21, 31 and 32 in series with individual adjustable resistances are connected in parallel to battery 24. Coils 41 and 38 are inductively coupled to the coils 47 and 48 of a variometer 49 connected in series with antenna 50 and ground.

The various parts of the system are so designed that when overload occurs it will take place at tube 31, hence the control electrode of this tube will become positive before that of any other tube of the system.

In the operation of this system signaling frequency currents are received at terminals 12 and 13 and flow through the primary winding of transformer 10. Corresponding alternating potentials are thereby induced in the secondary winding of this transformer and impressed upon the control electrode of tube 21. Amplified energy having corresponding variations is produced in the output circuit of this tube, and as a result thereof, amplified potentials are impressed upon the grid of tube 31 of modulating system 30, which potentials vary in accordance with signals. Accordingly, amplified variable signal current is produced in the output circuit of this tube. The energy of this current is supplied to the anode circuit of oscillator tube 32 and is so combined with the oscillatory currents flowing therein that the amplitude of the oscillations undergoes changes in accordance with signal variations. Signal modulated energy is therefore transmitted through the coupling between coils 41 and 47, to the antenna 50 from which it is radiated.

Resistance 28 and condenser 23, are connected in series across resistance 54. Resistance 28 is provided to reduce the potential applied to condenser 23 by the modulator 30 to prevent "singing". The potential referred to, which is applied to the control electrode of tube 21, is produced by current from the modulator flowing over a circuit from the plates of tubes 31 and 32, choke coil 37, generator 26 in shunt to condenser 27, resistance 54 to the filaments of the tubes.

The device 34 is connected to the input circuit of tube 31 to indicate when current flows in this circuit. In the normal operation of the system, the grid of tube 31 is maintained at a negative potential by the space current flowing through resistance 54. However, should the positive signal potentials impressed upon the control electrode of tube 31 by amplifier 20 be sufficiently great the control electrode of this tube will become positive. It is a well known fact that current will flow from filament to grid, viz, in the circuit containing the indicating device 34 only during the intervals of time in which the control electrode is positive. When the elements of the system are adjusted so that the control electrode of tube 31 has the proper degree of polarization this electrode will ordinarily just fail to become positive or become only slightly positive during the time the maximum positive signal potential is impressed thereon by the amplifier tube 21. Indicating device 34 may thus serve to show when the system is properly adjusted by virtue of the fact that if a signal potential somewhat greater than the maximum normally produced is impressed upon the amplifier 20, the grid of tube 31 will become positive for a short interval, resulting in a flow of current and an indication.

When the system is properly adjusted and is in operative condition and when no signaling currents are being received at terminals 12 and 13, the currents flowing in the anode circuits of tubes 31 and 32 produce constant deflection of the respective indicating devices 36 and 43. When signal currents are received and impressed upon the amplifier 20, the needles of the indicating devices 36 and 43 oscillate with an amplitude proportional to the degree of modulation and with frequencies corresponding more or less to the group or syllable frequency of the signals. The system may be adjusted to the proper operating condition by increasing the amplification of the signal currents supplied to the input terminals 12—13 until the amplitude of the swing of the needles of devices 36 and 43 reaches the correct value. In general when this adjustment is correct there will be occasional swings of the needle of device 34 produced by the occasional signal currents of maximum amplitude. When there is a continuous deflection of the needle of device 34 for a substantial period of time the condition of over-modulation is indicated.

When no movement of the needles of devices 34, 36 and 43 occurs the condition of substantially no modulation is indicated.

It is obvious that the circuit shown and described herein is only one of numerous embodiments in which this invention may be incorporated by persons skilled in the art, after a consideration of the disclosure herein contained. The scope of the invention is therefore only to be circumscribed as set forth in the appended claims.

What is claimed is:

1. In a radiant energy signaling system, a space discharge device, an input and output circuit for said device, means for impressing signal potentials upon said input circuit, a space discharge device having input and output circuits, said devices co-operating to produce a signal modulated wave, and means included in said circuits for indicating a plurality of different conditions in said system.

2. In combination in a radiant energy transmitting system, a source of signal current, means for amplifying said current, a space discharge modulator having input and output circuits, said modulator being coupled to an antenna, and means in said input circuit to indicate an abnormal condition in said modulator.

3. The combination in a radio signaling system of a space discharge oscillator and a space discharge amplifier, said oscillator and amplifier being provided with anodes and control electrodes, said oscillator and amplifier also being connected to a common current supply circuit, means connected to said respective anodes to indicate when either said amplifier or said oscillator, or both, are not supplied with modulating waves and a current indicator connected to said control electrode to indicate overloads.

4. In a radio transmitting system, a source of signal current, an amplifier for said current, a modulator supplied with the energy of amplified current, said modulator comprising a space discharge tube having a cathode, an anode and a control electrode, and means connected to said control electrode for indicating positive potentials thereof.

5. In a space discharge modulator, a plurality of three electrode discharge tubes, a source of current varying in accordance with signals, a control electrode for one of said tubes normally polarized negatively, and means for indicating when said electrode has the proper degree of polarization.

6. In a space discharge modulator a plurality of three electrode discharge tubes, a source of signal currents connected to a control electrode in one of said tubes, means for producing an average negative potential on said control electrode, and means operated only when said control electrode becomes positive to give an indication of overload.

7. In a radiant energy signaling system, a space discharge modulator comprising a plurality of space discharge tubes, one of said tubes being arranged to produce oscillations the other of said tubes comprising a cathode, an anode and a control electrode and being arranged to modulate said oscillations in accordance with signals, means connected in a circuit with said control electrode for producing polarization thereof such that normally no current flows in said circuit, and means for indicating when a flow of current takes place therein.

8. In a modulating system, a source of signal current and a source of high frequency oscillations, a space discharge tube having an input circuit and an output circuit, said source of signals being connected to said input circuit and said source of oscillations being connected to said output circuit, means in said output circuit to indicate when modulation is taking place, and means in said input circuit to indicate excessive modulation.

In witness whereof, I hereunto subscribe my name this 15th day of January, A. D., 1924.

EDWARD L. NELSON.